US009241190B2

(12) United States Patent
Chowdhury et al.

(10) Patent No.: US 9,241,190 B2
(45) Date of Patent: Jan. 19, 2016

(54) GENERATING A RESPONSE TO VIDEO CONTENT REQUEST INCLUDING DYNAMICALLY PROCESSED VIDEO CONTENT

(75) Inventors: Kuntal Chowdhury, Andover, MA (US); Sanil-Kumar Puthiyandyil, Nashua, NH (US); Arun Alex, Nashua, NH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 660 days.

(21) Appl. No.: 12/862,178

(22) Filed: Aug. 24, 2010

(65) Prior Publication Data

US 2012/0054809 A1 Mar. 1, 2012

(51) Int. Cl.
*H04N 7/173* (2011.01)
*H04N 21/472* (2011.01)
*H04N 21/485* (2011.01)
*H04N 21/222* (2011.01)
*H04N 21/2343* (2011.01)

(52) U.S. Cl.
CPC ..... *H04N 21/47202* (2013.01); *H04N 21/2223* (2013.01); *H04N 21/2343* (2013.01); *H04N 21/47205* (2013.01); *H04N 21/4854* (2013.01)

(58) Field of Classification Search
USPC ..................................................... 725/86–93
See application file for complete search history.

(56) References Cited

U.S. PATENT DOCUMENTS

| 6,138,156 | A | 10/2000 | Fletcher et al. |
| 6,431,875 | B1 | 8/2002 | Elliott et al. |
| 6,477,590 | B1 | 11/2002 | Habusha et al. |
| 6,687,252 | B1 | 2/2004 | Bertrand et al. |
| 6,714,987 | B1 | 3/2004 | Amin et al. |
| 6,775,273 | B1 | 8/2004 | Kung et al. |
| 6,778,494 | B1 | 8/2004 | Mauger |
| 6,847,991 | B1 | 1/2005 | Kurapati |
| 6,853,630 | B1 | 2/2005 | Manning |
| 6,854,014 | B1 | 2/2005 | Amin et al. |
| 6,888,821 | B2 | 5/2005 | Rasanen et al. |
| 6,973,309 | B1 | 12/2005 | Rygula et al. |

(Continued)

FOREIGN PATENT DOCUMENTS

WO    WO-0122642 A2    3/2001

OTHER PUBLICATIONS http://www.3gpp.org/ftp/Specs/html-info/24229.htm printed Jan. 13, 2011. 4 pages.

(Continued)

*Primary Examiner* — Pankaj Kumar
*Assistant Examiner* — Charles N Hicks
(74) *Attorney, Agent, or Firm* — Patent Capital Group (57) ABSTRACT

In one embodiment, a video processing server including a memory capable of storing data and a processor is disclosed. The processor is configured for using the data such that the video processing server can receive a request redirected from a gateway for a video content, wherein the request is redirected by the gateway based on information contained in the request and wherein the information contained in the request includes control data used for an optimal delivery of the video content. The processor is further configured for using the data such that the video processing server can send the redirected request to a content provider identified in the request, receive the requested video content from the content provider, and generate a response to the request by modifying the video content based on the control data.

20 Claims, 8 Drawing Sheets

(56) References Cited

U.S. PATENT DOCUMENTS

| | | | |
|---|---|---|---|
| 7,447,775 B1* | 11/2008 | Zhu et al. | 709/226 |
| 7,454,206 B1 | 11/2008 | Phillips et al. | |
| 7,724,753 B2* | 5/2010 | Naqvi et al. | 370/410 |
| 7,813,759 B2 | 10/2010 | Virgile | |
| 7,855,982 B2 | 12/2010 | Ramankutty et al. | |
| 7,945,648 B2* | 5/2011 | Tan | 709/221 |
| 8,010,984 B2* | 8/2011 | Thukral | 725/86 |
| 2002/0029260 A1 | 3/2002 | Dobbins et al. | |
| 2002/0131404 A1 | 9/2002 | Mehta et al. | |
| 2003/0016630 A1 | 1/2003 | Vega-Garcia et al. | |
| 2004/0047290 A1 | 3/2004 | Komandur et al. | |
| 2004/0111476 A1 | 6/2004 | Trossen et al. | |
| 2005/0005025 A1 | 1/2005 | Harville et al. | |
| 2006/0031559 A1 | 2/2006 | Sorokopud et al. | |
| 2007/0022199 A1 | 1/2007 | Tatsubori | |
| 2008/0137541 A1 | 6/2008 | Agarwal et al. | |
| 2009/0282444 A1* | 11/2009 | Laksono et al. | 725/89 |
| 2009/0320077 A1* | 12/2009 | Gazdzinski | 725/62 |

OTHER PUBLICATIONS http://www.acmepacket.com/html/page.asp?PageID=%7bFB2657BA-EE7A-46C1-BEA8-F650C93BF5C3%7d—printed on Dec. 5, 2009. 4 pages.

CTLabs Report, "SIP and RTP Denial of Service Attack Tests Summary." pp. 1-4. 2005. 4 pages.

http://www.3gpp.org, 3GPP TS 24.229 V6. 12.0 (Sep. 2006), pp. 1-304. Oct. 3, 2006. 304 pages.

* cited by examiner

Figure 8

GENERATING A RESPONSE TO VIDEO CONTENT REQUEST INCLUDING DYNAMICALLY PROCESSED VIDEO CONTENT

FIELD OF THE DISCLOSURE

The present disclosure generally relates to generating a response to a request for video content including dynamically processed video content.

BACKGROUND

Wireless networks are telecommunications networks that use radio waves to carry information from one node in the network to one or more receiving nodes in the network. Wired communication can also be used in portions of a wireless network, such as between cells or access points. Cellular telephony is characterized by the use of radio cells that provide radio coverage for a geographic area, with multiple cells arranged to provide contiguous radio coverage over a larger area. The first generation of wireless telephone technology used analog mobile phones in which analog information signals were transmitted. As technology progressed a second generation (2G) of wireless service was introduced. In 2G systems, digital information signals were used to modulate a carrier. Such networks that were upgraded to handle higher-speed packet data in networks referred to as 2.5G and 3G networks. The next evolution is 4G technology, which is referred to as long term evolution-system architecture evolution (LTE-SAE) and uses orthogonal frequency division multiple access (OFDMA) technology.

Wireless communication technologies are used in connection with many applications, including, for example, satellite communications systems, portable digital assistants (PDAs), laptop computers, and mobile devices (e.g., cellular telephones, user equipment). One benefit that users of such applications can obtain is the ability to connect to a network (e.g., the Internet) as long as the user is within range of such a wireless communication technology. Current wireless communication systems use either, or a combination of, circuit switching and packet switching in order to provide mobile data services to mobile devices. Generally speaking, with circuit-based approaches, wireless data is carried by a dedicated (and uninterrupted) connection between the sender and recipient of data using a physical switching path. Packet-based approaches, on the other hand, do not permanently assign transmission resources to a given session, and do not require the set-up and tear-down of physical connections between a sender and receiver of data. In general, a data flow in packet-based approaches is divided into separate segments of information or packets. The data flow may include a number of packets or a single packet.

Another aspect gaining interest and prominence is the ability to provide seamless Internet video traffic to mobile users. Internet video traffic currently takes up a significant portion of all the consumer traffic. More importantly, it is likely to account for a much bigger portion of the consumer traffic in near future. Demands for Internet video has only been increasing since it has become available to the consumers. This means that the existing networks would likely become overloaded with the ever increasing video traffic.

Overview

This disclosure relates to systems, methods, and logic encoded in one or more tangible media for generating a response to a request for video content including dynamically processed video content. In one embodiment, a video processing server including a memory capable of storing data and a processor is disclosed. The processor is configured for using the data such that the video processing server can receive a request redirected from a gateway for a video content, wherein the request is redirected by the gateway based on information contained in the request and wherein the information contained in the request includes control data used for an optimal delivery of the video content. The processor is further configured for using the data such that the video processing server can send the redirected request to a content provider identified in the request, receive the requested video content from the content provider, and generate a response to the request by modifying the video content based on the control data.

DESCRIPTION OF EXAMPLE EMBODIMENTS

Systems, methods, and logic encoded in one or more tangible media are disclosed for generating a response to a request for video content including dynamically processed video content. One way to handle the ever increasing mobile demand for Internet video content would be to customize the video content to each kind of mobile network and/or mobile device, whereby the amount of bandwidth needed in the wireless network as well as the backhaul network to carry the video traffic would be reduced. One way to achieve the reduction of bandwidth requirement without sacrificing the capacity of the existing platform is to use video processing servers to dynamically process certain data streams. When a gateway receiving requests for video content detects requests for video streams requiring dynamic processing based on pre-defined criteria, e.g., URL match or the like, such requests are directed to a video processing server. The video processing server performs desired dynamic processing on the video content received from content providers based on relevant information, such as content type, mobile type, subscription information, and the like. The video processing server then sends the dynamically processed video content back to the gateway for further processing.

Figure 1:
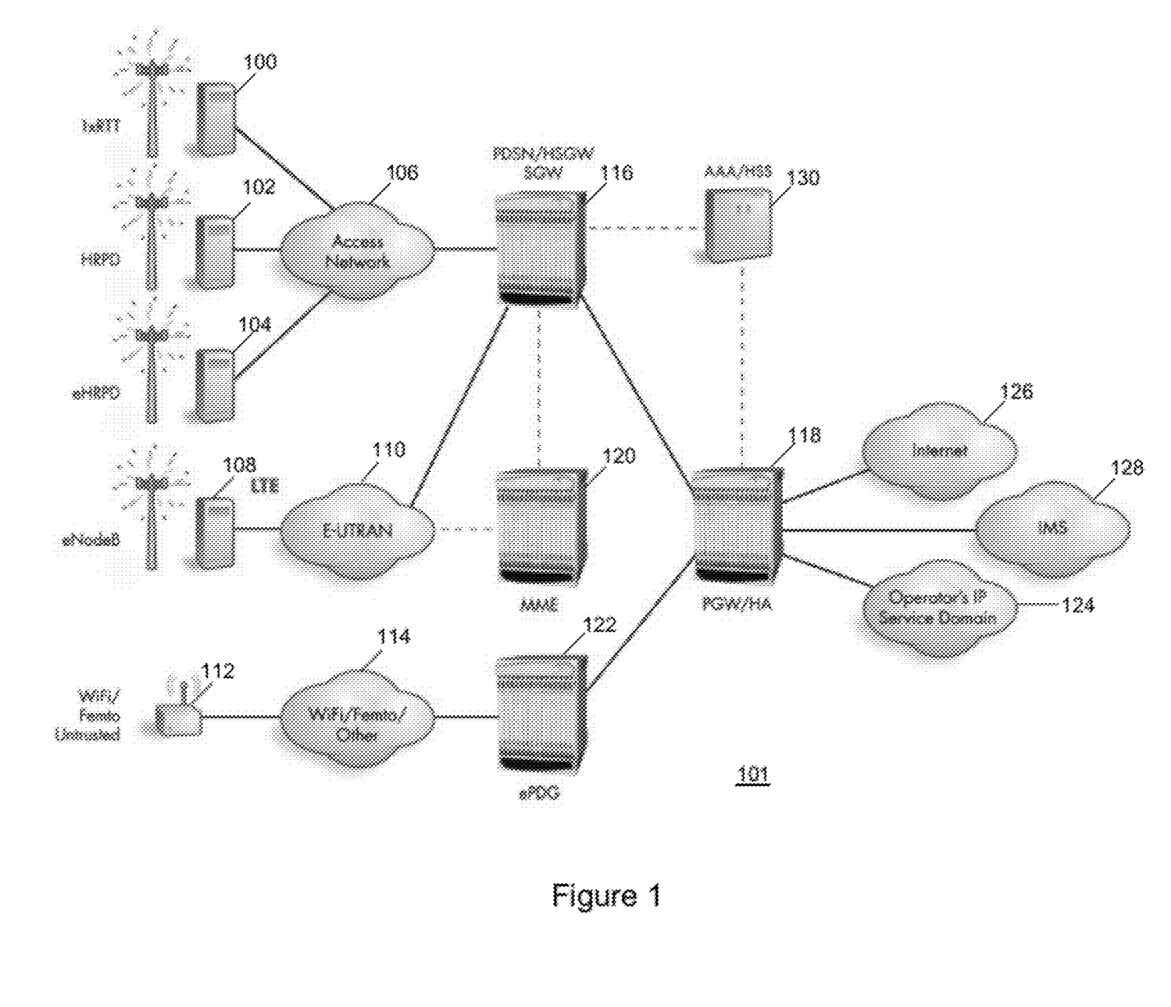
FIGS. 1-2 illustrate communication networks including a long term evolution (LTE) topology in accordance with some embodiments.

FIG. 1 illustrates a communication network 101 that includes systems, methods, and logic encoded in one or more tangible media for generating a response to a request for video content including dynamically processed video content in accordance with certain embodiments. Referring to FIG. 1, the communication network 101 includes a number of radio access technologies such as a 1xRTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as WiFi, Femto, WiMAX, or any other radio spectrum technology can use transceiver 112 to connect to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1xRTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA), and a mobility management entity (MME) 120. On the access network side, the anchor gateway 118 can also communicate with an evolved packet data gateway (ePDG) 122 which provides connectivity to the WiFi/Femto/other transceiver 112. On the packet core side, the anchor gateway can communicate with the operator's IP service domain 124, the internet 126, and IP multimedia subsystem (IMS) 128. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communications network includes the MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1X and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attachment and at time of an intra-LTE handover. The MME also authenticates the user by interacting with the HSS 130. The MME also generates and allocates temporary identities to UEs and terminates Non-Access Stratum (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG 122 is responsible for interworking between the EPC and fixed non-3GPP access technologies such as a WiFi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
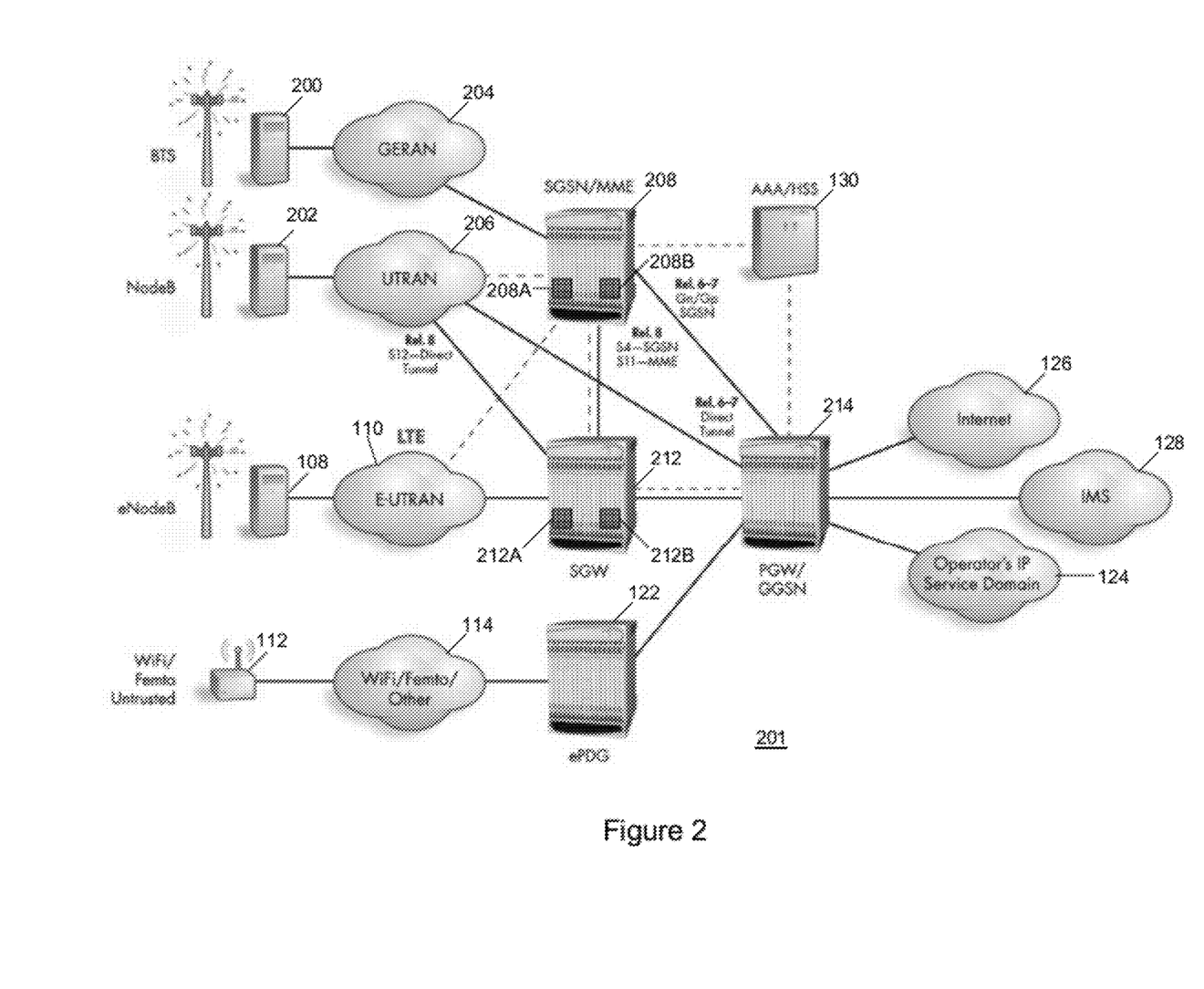

FIG. 2 illustrates a communication network 201 that implements systems, methods, and logic encoded in tangible media for generating a response to a request for video content including dynamically processed video content with legacy universal mobile telecommunications systems (UMTS) network devices in accordance with certain embodiments. Referring to FIG. 2, the legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 having processor(s) 208A and memory 208B with a mobility management entity (MME). The GERAN 204 can communicate through the SGSN functionality on gateway 208 to serving gateway (SGW) 212 having processors 212A and memory 212B or gateway GPRS support node (GGSN)/PGW 214.

In some embodiments, the systems, methods, and logic encoded in tangible media for generating a response to a request for video content including dynamically processed video content can be implemented on a gateway, such as PDSN/HSGW/SGW 116. The gateway can access and maintain information relating to the communication session, the subscriber, the radio bearers, and the policies relating to the communication session. The gateway may be used to provide various services to a mobile device and implement the quality of service (QoS) on packet flows. Several of these functions are used in providing, for example, voice over IP (VoIP) routing and enhanced services, such as enhanced charging, stateful firewalls, traffic performance optimization (TPO). The communication networks also allow provision of applications such as VoIP, streaming video, streaming music, multi-user gaming, location based services, and a variety of content delivered to a mobile node. Residing within the gateway can be one or more network processing units, line cards, as well as packet and voice processing cards.

Figure 3:
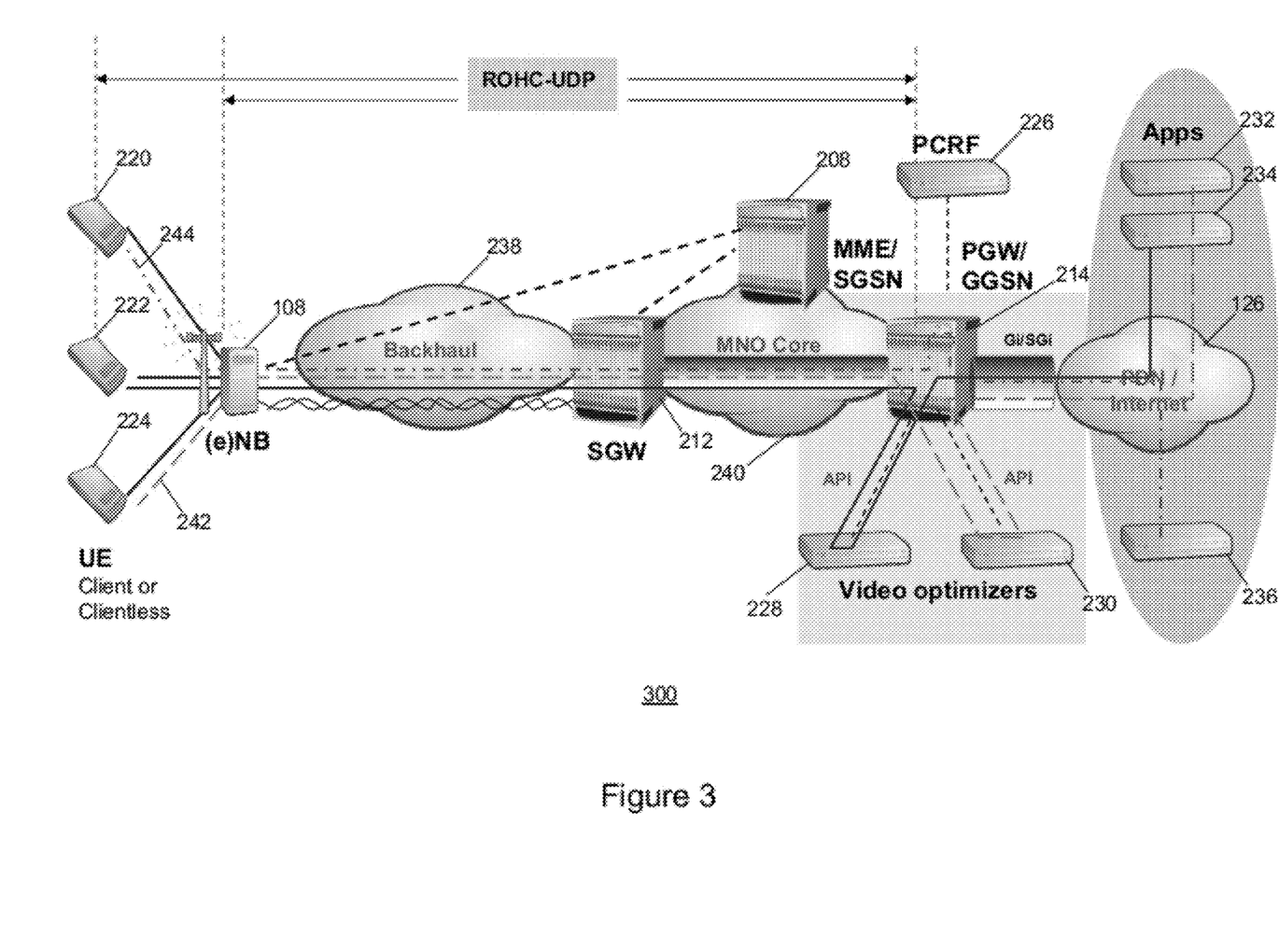
FIG. 3 illustrates a communication network where processing is provided through an interface in accordance with certain embodiments.

FIG. 3 illustrates a communication network 300 where processing is provided through an interface in accordance with certain embodiments. Referring to FIG. 3, the communication network 300 can include mobile devices such as user equipment (UE) 220, 222, and 224, an evolved NodeB (eNB) 108, a serving gateway (SGW) 212, a MME/SGSN 208, a PGW/GGSN 214, a policy and charging rules function (PCRF) 226, video processing servers 228 and 230, application servers 232, 234, and 236, packet data network/Internet 126, backhaul network 238, and mobile network operator core network 240. The PCRF 226 can encompass policy control decision and packet flow based charging control functionalities. PCRF 226 can be used to supply policy and rules that are enforced at the gateway that include, for example, the QoS provided, the features available to a mobile node, and the charging that is performed. The video processing servers 228 and 230 include stand alone network devices that process media content such as video to provide services such as compression, trans-coding, and trans-rating. Application or content servers 232, 234, and 236 can provide media content such as video, games, audio, or interactive content, for example, to user equipment 220, 222, and 224.

Media processing can be performed on one of video processing servers 228 or 230, or on the gateway, such as PGW 214. This processing can include compression, trans-coding, and trans-rating. Trans-rating includes changing the bit-rate (bandwidth) of a media stream through processing. For example, an input video stream of 1 Mbps can be processed so that the output stream is 256 Kbps. Trans-rating can increase or decrease the bit-rate, and usually involves changing the encoding parameters (usually quantization). Trans-coding can involve changing the encoding or format of the media stream, including changing the stream to a more lossy format. Compression can be introduced with trans-rating or trans-coding, or be performed separately on the header and/or payload.

One type of compression that can be performed is robust header compression (ROHC), which is a way to compress headers of communication network packets. The types of headers that undergo compression are internet protocol (IP) headers, user datagram protocol (UDP) headers, real-time transport protocol (RTP) headers, and transport control protocol (TCP) headers. In streaming applications, the overhead of IP, UDP, and RTP headers can be 40 bytes for IPv4, or 60 bytes for IPv6. Depending on the situation, this can consume a significant amount of bandwidth on the wireless link. For example, ROHC can be used to compress these 40 bytes or 60 bytes of overhead into 1 or 3 bytes by placing a compressor before the link and a decompressor after that link. The compressor converts the large overhead to only a few bytes, while the decompressor does the opposite. The ROHC algorithm is similar to video compression, in that a base frame and then several difference frames are sent to represent an IP packet flow. This has the advantage of allowing ROHC to survive many packet losses in its highest compression state, as long as the base frames are not lost. Video compression can also be introduced on the payload of packets that involves a base frame and then several difference frames to represent the video content. The compression processing can involve the application of a discrete cosine transform (DCT), a discrete wavelet transform (DWT), fractal compression, or matching pursuit to provide compression of media.

In operation, a media stream such as a movie can be requested by UE 224. This request is used to setup a packet flow 242 from server 232 to mobile device 224. Packet flow 242 is sent from server 232 to PDN/Internet 126 where it can be routed and tunneled to gateway 214. The gateway 214 can either detect or know that the packets in packet flow 242 contain video information. The gateway 214 can use information such as policy, session, and/or subscriber information to determine how to handle packet flow 242. The handling can include offloading packet flow 242 for processing at video processing server 230. An interface, such as an application programming interface (API), can be used to interact with video processing server. The APIs can include open graphics library (OpenGL), open computing language (OpenCL), and/or simple direct-media layer (SDL).

The interface can be used to offload or transmit the packet flow 242 to video processing server 230 along with varying amounts of control information. The control information can include a dynamic video processing profile that instructs the video processing server on how to process the video and/or raw data that the video processing server can use in processing the video. The raw data can include information such as location, time of day (ToD), access technology, quality of service (QoS) including a QoS class identifier (QCI), handover capability, roamer, device type (e.g., machine to machine (M2M), smart phone), subscriber type (e.g., premium user, post paid user, blacklisted user), inter-UE transfer (IUT) status, service type (e.g., video on demand (VoD), over-the-top (OTT), Internet Protocol television (IPTV)), and/or lawful intercept (LI) status.

After processing packet stream 242 at video processing server 230, PGW/GGSN 214 sends the packet stream 242 across the MNO core 240 to SGW 212. SGW 212 can direct packet flow 242 across backhaul network 238 to eNB 108. At eNB 108, the packet flow 242 can be converted to radio waves and sent over an airlink to UE 224. An access technology can determine the frequency and other characteristics of the radio wave communication between the UE 224 and eNB 108.

In other embodiments, a packet flow can also be passed through gateway 214 without processing the packet flow or processed on the gateway 214 using a circuit board card connected in the chassis running gateway 214. As shown in packet flow 244, at gateway 214 the packet flow is processed in-line on the gateway itself without sending the packet flow to a separate device. Processing packet flow 244 on the gateway 214 can provide less delay, conserve network resources, and simplify the network. The processing preformed on the media content can also be varied including any combination of trans-coding, trans-rating, and compression. The gateway can also provide charging capability to allow operators to adjust charging based on the type of processing performed on the media content.

Figure 4:
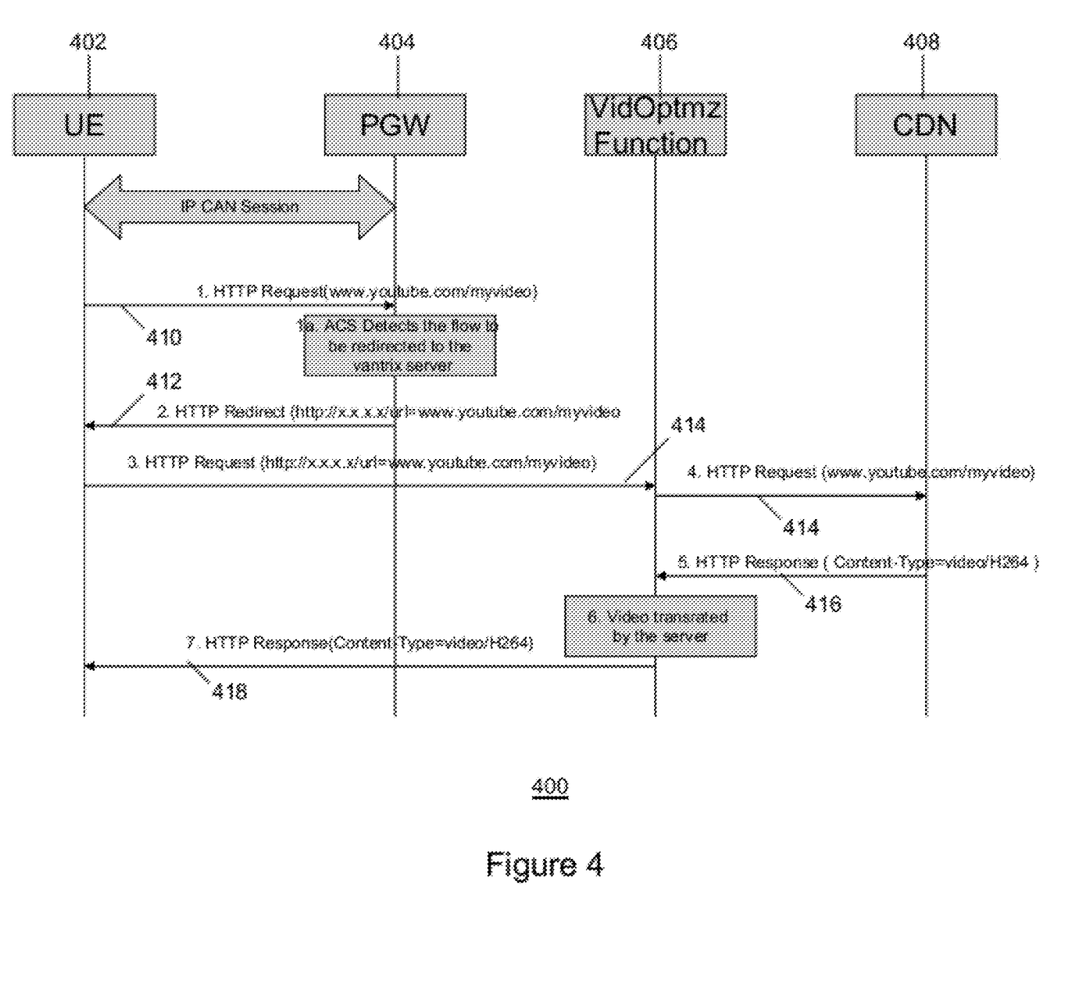
FIG. 4 is a message/signaling flow diagram illustrating dynamic processing of a response to a video content request by trans-rating and/or trans-coding of the video content at a video processing server in accordance with certain embodiments.

FIG. 4 is a message/signaling flow diagram 400 illustrating dynamic processing of a response to a video content request by trans-rating and/or trans-coding of the video content at a video processing server in accordance with certain embodiments. Referring to FIG. 4, a user equipment (UE) 402 sends a request 410, such as a Hypertext Transfer Protocol (HTTP) request, addressed to a content provider 408, such as youtube.com, for video content. The HTTP request 410 is first received by a gateway, such as packet data gateway (PGW) 404, for further processing. It is assumed that an IP-Connectivity Access Network (IP CAN) session has been established between the UE 402 and the PGW 404.

Next, an Access Control Server (ACS) in the PGW 404 determines whether to direct the request 410 to a video processing server 406 based on the information contained in the request 410, such as the address, or the uniform resource locator (URL), of the content provider 408. In some embodiments, for example, the ACS relies on a pre-defined list of URLs of video content provider for making the redirection determinations.

Once the ACS determines to direct the video content request 410 to the video processing server 406, the PGW 404 sends a redirect request 412 to the UE 402. Upon receiving the redirect request 412, the UE 402 sends a redirected request 414 to the video processing server 406. The video processing server 406 then terminates the HTTP connection from the UE 402 and originates a copy of the redirected request 414 to the addressed content provider 408. Upon receiving the request 414, the content provider 408 generates a response 416 including the requested video content and sends it back to the video processing server 406. In some embodiments, the video processing server 406 originates the redirected request 414 to, and receives the response 416 from, the content provider 408 by establishing HTTP connections. In other embodiments, the video processing server 406 may establish IP connections or virtual LAN (VLAN) connections for originating the redirect request 414 to, and receiving a response 416 from, the content provider 408.

Upon receiving the response 416 from the content provider 408, the video processing server 406 dynamically processes the response 416 to generate a dynamically processed response 418 based on the information contained in the request 414, such as the device type of the UE 402, as well as the information contained in the response 416, such as the content type (e.g., video/H264). For example, the header of an HTTP request 414 may contain User-Agent information that may include device type of the UE 402. Based on the device type of the UE 402, for instance, the requested video content in the response 416 may be trans-rated (e.g., data rate reduction) so that the video content can be adapted to the screen size of the UE 402, thereby conserving the bandwidth used in the mobile network serving the UE 402. The video processing server 406 then sends the dynamically processed response 418 back to the UE 402.

Wherein the response 416 indicates that the content type is a real-time video stream (e.g., application/sdp), the UE 402 initiates a real-time streaming protocol (RTSP) session upon receiving the dynamically processed response 418 to receive the real-time stream. In some embodiments, the ACS, or enhanced charging service (ECS), in the PGW 404 detects the RTSP session and readdresses the session to the video processing server 406. The video processing server 406 then receives the real-time video stream from the content provider 408 and processes the real-time stream for an optimal delivery to the UE 402. For example, the video processing server 406 can trans-code the real-time stream before sending the stream to the UE 402. In some embodiments, the real-time video stream can be modified (e.g., trans-rating, trans-coding, etc.) based on the changes in the network, such as handoffs, congestions, and over subscriptions, that are dynamically detected by the PGW 404.

Figure 5:
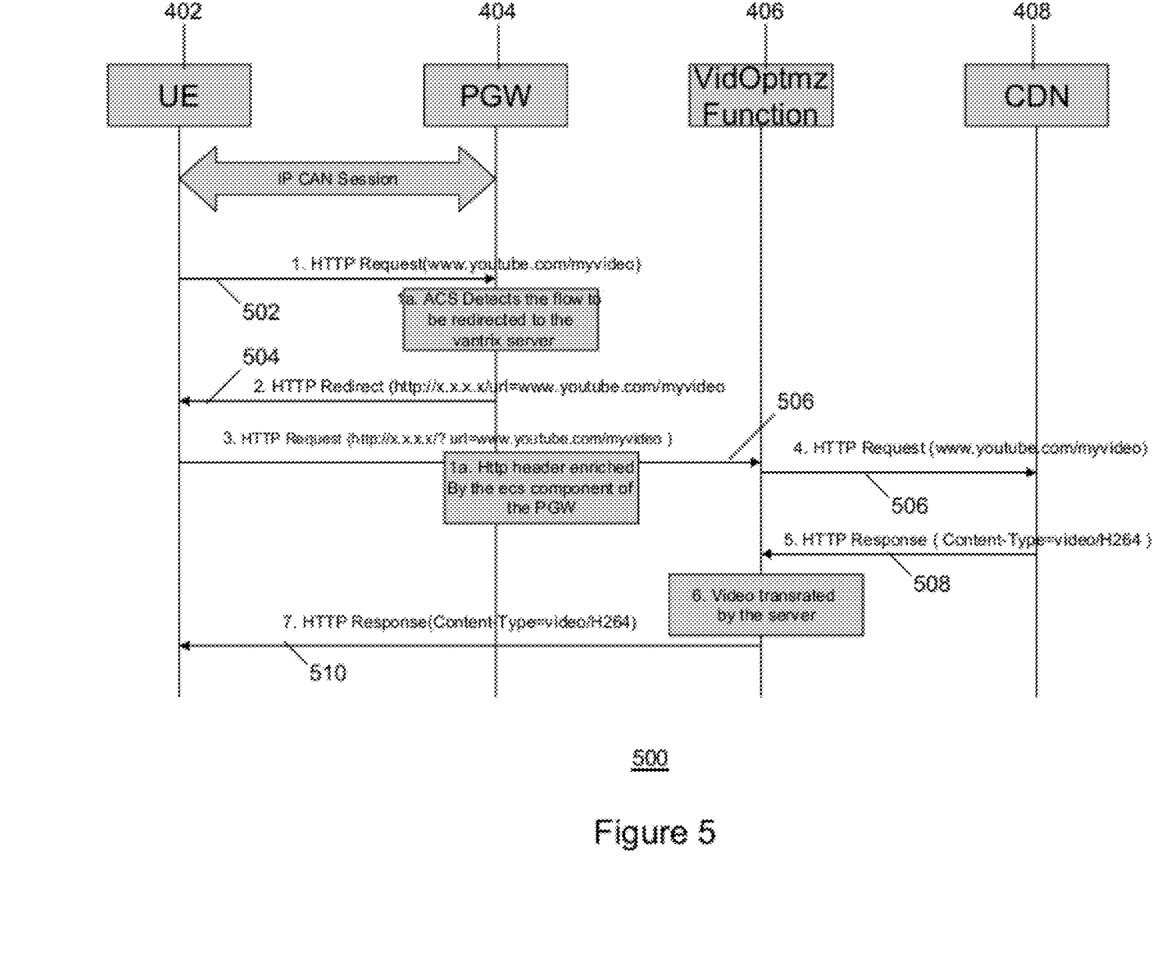
FIG. 5 is a message/signaling flow diagram illustrating dynamic processing of a response to a video content request at a video processing server based on enhanced request information in accordance with certain embodiments.

FIG. 5 is a message/signaling flow diagram 500 illustrating dynamic processing of a response to a vide content request at a video processing server based on enhanced request information in accordance with certain embodiments. Referring to FIG. 5, the UE 402 sends a request 502 addressed to the content provider 408 for video content to the PGW 404, which receives the request 502 and determines whether to redirect it to the video processing server 406 based on the information included in the request 502, such as the address, or URL, of the content provider 408. Upon deciding to redirect the request 502, the PGW 404 sends a redirect request 504 to the UE 402, which in turn sends a redirected request 506 to the video processing server 406 via the PGW 404.

The ACS or ECS in the PGW 404 intercepts the redirected request 506 and enriches the request 506 with additional information. For example, additional information may be added to enrich the HTTP header of a redirected HTTP request 506 as part of x-header fields. Table 1, shown below, includes the attributes supported for HTTP header enrichment.

TABLE 1

HTTP Header Enrichment Parameters

| HTTP Extended Parameters | Value |
| --- | --- |
| x-url | The original requested URL |
| x-ggsn-address | GGSN/PGW address |
| x-sgsn-address | SGSN/SGW/HSGW address |
| x-imsi | IMSI of the subscriber |
| x-subscirber-ip-address | IP address assigned to the subscriber |

TABLE 1-continued

HTTP Header Enrichment Parameters

| HTTP Extended Parameters | Value |
| --- | --- |
| x-qos | QCI; UplinkGBR; DownlinkGBR; UplinkMBR; DownlinkMBR |
| x-access-type | Radio access technology type |
| x-subscriber-profile-id | String value identifying a specific subscriber profile on the video processing server |
| x-roaming-status | Roaming status of the subscriber |
| x-subs-profile | Gold, Silver, and Bronze customer |
| x-time-of-day | Red, Orange, and Green, which would trigger Vantrix Bandwidth Optimizer to use a transcoding/transrating profiles D, E. and F, respectively |
| x-watermark | YES would trigger Vantrix Bandwidth Optimizer to apply watermarking |

The PGW 404 then sends the enriched request 506 to the video processing server 406, which terminates the HTTP connection from the UE 402 and originates a copy of the enriched request 506 to the content provider 408. The content provider 408 processes the request 506, generates a response 508 including the requested video content, and sends the response 508 back to the video processing server 406. The video processing server 406 then dynamically processes the video content included in the response 508 in order to generate a dynamically processed response 510 based on the information contained in the enriched request 506 and the information included in the response 508. The video processing server 406 then sends the dynamically processed response 510 back to the UE 402. In some embodiments, the PGW 404 receives the dynamically processed response 510 and forwards it back to the UE 402.

In some embodiments, the PGW 404 further processes the dynamically processed response 510 before forwarding it back to the UE 402. For example, the PGW 404 may further process the video content in the response 510 based on the subscription level of the subscriber originating the video content request (UE 402). The PGW 404 may also perform additional processing of the video content based on a cost benefit analysis involving potential bandwidth saving and the video content quality enhancement. In some embodiments, the PGW 404 may choose a method of processing the video content for the most cost effective delivery of the content. In other embodiments, the PGW 404 would choose a processing method that can achieve increased delivery speed of the requested content and/or enhanced quality of the delivered content.

In some embodiments, for example, an enrichment parameter, such as x-subscriber-profile-id or x-subs-profile, can be used to enrich the redirected request 506, causing the video processing server 406 to generate the dynamically processed response 510 using specific subscriber profile information for deciding the specific processing functions to be performed on the requested video content. In some embodiments, an enrichment parameter, such as x-time-of-day, can be used to enrich the redirected request 506, causing the video processing server 406 to generates the dynamically processed response 510 based also on the time of the day information. For example, the video processing server 406 may trans-rate the video content in the response 508 at a lower bit rate during the prime time evening when there is a high volume of demands for video content, in order to prevent the mobile network carrying the video traffic from suffering congestion and resulting delays.

In some embodiments, an enrichment parameter, such as x-watermark, can be used to enrich the redirected request 506, causing the video processing server 406 to add watermark information to the dynamically processed response 510. For example, the video processing server 406 may overlay the video content in the dynamically processed response 510 with static images data before sending the response 510 back to the UE 402. For instance, the video processing server 406 may overlay the video content with a static image related to a local advertisement, such as an image of a restaurant and its telephone number, an image for advertising a visiting circus, etc. The video processing server 406 may also overlay the video content in the dynamically processed response 510 with video image data. For instance, the video processing server 406 may overlay the video content with a video data image, such as crawling text showing near real-time stock quotes or headline news.

In some embodiments, enrichment parameters, such as x-qos and/or x-access-type, can be used to enrich the redirected request 506, causing the video processing server 406 to generate the dynamically processed response 510 based on the quality of service (QoS) allocated to the mobile network carrying the requested video content and/or the mobile access technology of the mobile network. For example, the video content may be trans-rated based on the mobile QoS or mobile access technology specified in the enriched request 506.

Figure 6:
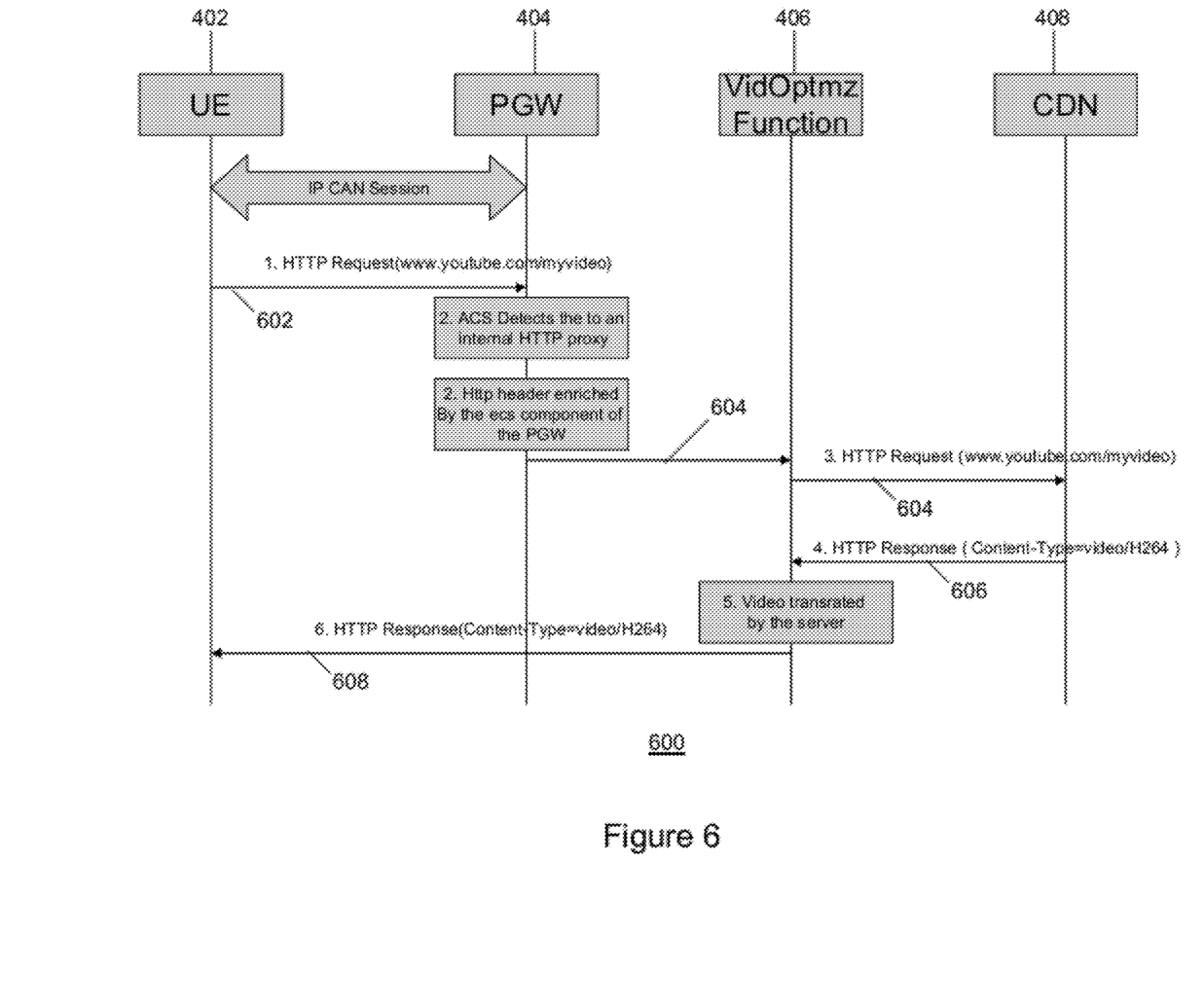
FIG. 6 is a message/signal flow diagram illustrating dynamic processing of a response to a video content request directed to a video processing server by a proxy in accordance with certain embodiments.

FIG. 6 is a message/signal flow diagram 600 illustrating dynamic processing of a response to a video content request directed to a video processing server by a proxy in accordance with certain embodiments. Referring to FIG. 6, the UE 402 sends a request 602 addressed to the content provider 408 for video content. The PGW 404 receives the request 602 and the ACS in the PGW 404 determines whether to send it to the video processing server 406 based on the information included in the request 602, such as the address, or URL, of the content provider 408.

Upon deciding to direct the request 602 to the video processing server 406, the ACS enriches the request 602 with additional information, such as shown in Table 1, and directs the enriched request 604 to a proxy server in the PGW 404, such as an internal HTTP proxy server. The proxy server then directs the enriched request 604 to the video processing server 406, saving the delay associated with having to redirect the request.

Upon receiving the enriched request 604, the video processing server 406 terminates the HTTP connection from the UE 402 and originates a copy of the enriched request 604 to the content provider 408. The content provider 408 processes the request 604, generates a response 606 including the requested video content, and sends the response 606 to the video processing server 406. The video processing server 406 then dynamically modifies the video content included in the response 606 in order to generate a dynamically processed response 608 based on the information contained in the enriched request 604 and the information included in the response 606, such as the content type. The video processing server 406 then sends the dynamically processed response 608 back to the UE 402. In some embodiments, the PGW 404 receives the dynamically processed response 608 and forwards it back to the UE 402. In some embodiments, the PGW 404 further processes the dynamically processed response 608 before forwarding it back to the UE 402.

Figure 7:
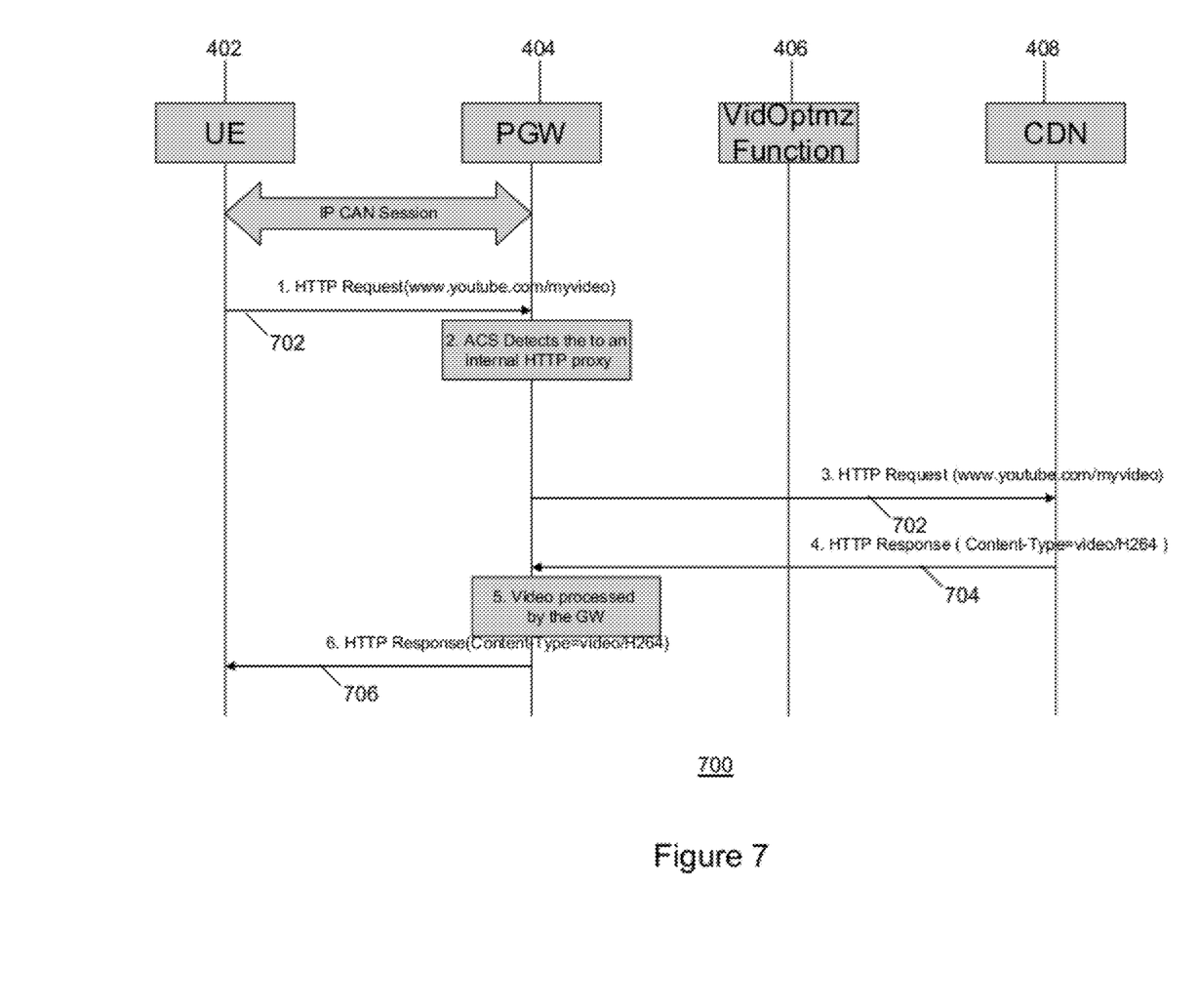
FIG. 7 is a message/signaling flow diagram illustrating generation of a response to a video content request that is not directed to a video processing server in accordance with certain embodiments.

FIG. 7 is a message/signaling flow diagram 700 illustrating generation of a response to a video content request that is not directed to a video processing server in accordance with certain embodiments. Referring to FIG. 7, the UE 402 sends a request 702 addressed to the content provider 408 for video content. The PGW 404 receives the request 702 and the ACS in the PGW 404 determines whether to send the request 702 to the video processing server 406 based on the information included in the request 702, such as the address, or URL, of the content provider 408.

If dynamic processing of the requested video content is likely to consume only marginal CPU and/or memory resources, the processing may be performed at the PGW 404 at the expense of causing marginal impact on performance of the PGW 404. The video processing performed at the PGW 404, instead at the video processing server 406, is referred to as inline dynamic processing. Table 2, shown below, includes a list of inline dynamic processing functions.

choose to perform a video processing method (e.g., inline processing, redirecting) that is the most cost effective for the content provider 408. In other embodiments, the PGW 404 would choose a processing method that can achieve a higher performance for the subscriber in terms of the delivery speed of the requested content and/or the quality of the delivered content.

Upon deciding not to send the request 702 to the video processing server 406, the ACS directs the request 702 to an internal video processing server. The internal video processing server then forwards the request 702 to the content provider 408. The content provider processes the request 702, generates a response 704, and sends the response 704 to the internal video processing server in the PGW 404. The internal video processing server performs inline dynamic processing of the response 704 to generate an inline-processed response 706. The video processing server then sends the inline-processed response 706 back to the UE 402 via PGW 404.

Mobile Subscriber and Gateway

The mobile subscriber described above can communicate with a plurality of radio access networks using a plurality of access technologies and with wired communication networks. The mobile subscriber can be a smartphone offering advanced capabilities such as word processing, web browsing, gaming, e-book capabilities, an operating system, and a

TABLE 2

Inline Dynamic Video Processing Functionality and Processing Estimates

| Inline Processing Function | Memory Impact | CPU Impact | Number of User Impacted |
|---|---|---|---|
| Trans-coding | HIGH | HIGH | Low: possibly for some old mobile devices |
| Trans rating | HIGH | HIGH | Potentially High: due to the number of different display resolutions that need to be supported |
| Static Image Overlay | HIGH | HIGH | Potentially High: Advertisement Overlay |
| Video Overlay | HIGH | HIGH | Potentially High: Advertisement Overlay |
| Alpha Blending & Video Effects | HIGH | HIGH | N/A |
| Text Overlay | MEDIUM | MEDIUM | Potentially High: Advertisement Overlay |
| Video Insertion | MEDIUM | MEDIUM | Potentially High: Advertisement Overlay |
| Content Insertion & Caching with segmented video streams | LOW | LOW | HIGH: With technologies like HTTP Live, the video is segmented and the play list contains information on the segments, which can be manipulated at the gateway for restriction or caching purpose |

For example, one of the inline functionality that can be effectively performed by the PGW 404 would be caching of processed contents. For instance, the segmented video streams for HTTP Live are usually about 10 seconds long and could be cached effectively for the same subscriber or other subscribers with similar subscriber profiles. Another such functionality would be content insertion at the start of a video stream.

In some embodiments, the PGW 404 determines whether to perform inline processing of the video content request based on the subscription level of the subscriber originating the video content request. The PGW 404 may also determine whether to perform inline processing based on a cost benefit analysis involving potential bandwidth saving and increased inline resource usage that may result from processing the request inline. In some embodiments, the PGW 404 may full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The mobile subscriber may have the capability to run applications or communicate with applications that are provided by servers in the communication network. The user equipment can receive updates and other information from these applications on the network.

The mobile subscriber also encompasses many other devices such as televisions (TVs), video projectors, set-top boxes or set-top units, digital video recorders (DVR), computers, netbooks, laptops, notebooks, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The mobile subscriber can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The gateway described herein can implement multiple and different integrated functionalities. In some embodiments, one or more of an access service network gateway (ASNGW), mobility access gateway (MAG), an HRPD serving gateway (HSGW), a mobility management entity (MME), a packet data serving node (PDSN), a foreign agent (FA), a local mobility anchor (LMA), a PDN gateway (P-GW), and a home agent (HA) can be implemented on a gateway. Other types of functionalities that can also be implemented on a gateway in other embodiments are a Gateway General packet radio service Support Node (GGSN), a serving GPRS support node (SGSN), a packet data inter-working function (PDIF), a base station, a access network, a User Plane Entity (UPE), an IP Gateway, an access gateway, a session initiation protocol (SIP) server, a proxy-call session control function (P-CSCF), and an interrogating-call session control function (I-CSCF). In certain embodiments, one or more of the above-mentioned other types of functionalities are integrated together or provided by the same functionality. For example, an access network can be integrated with a PDSN. A gateway can include a PDSN, a FA, a HA, a GGSN, a PDIF, an ASNGW, a UPE, an IP Gateway, an access gateway, or any other applicable access interface device. In certain embodiments, a gateway is provided by Starent Networks, Corp. of Tewksbury, Mass. in a ST16 or a ST40 multimedia platform.

The gateway can also support sessions originated from a Femto base station, which would connect to the gateway through a broadband network. A person or corporation may use a Femto base station in a home or business to support one or more mobile subscribers. The gateway can provide trigger based traffic management during a handoff from a Femto base station to a WiMAX or other macro base station, while maintaining traffic management for the mobile node. In certain embodiments, a gateway device is provided by Starent Networks, Corp. of Tewksbury, Mass. on an ST16 or ST40 multimedia platform.

Figure 8:
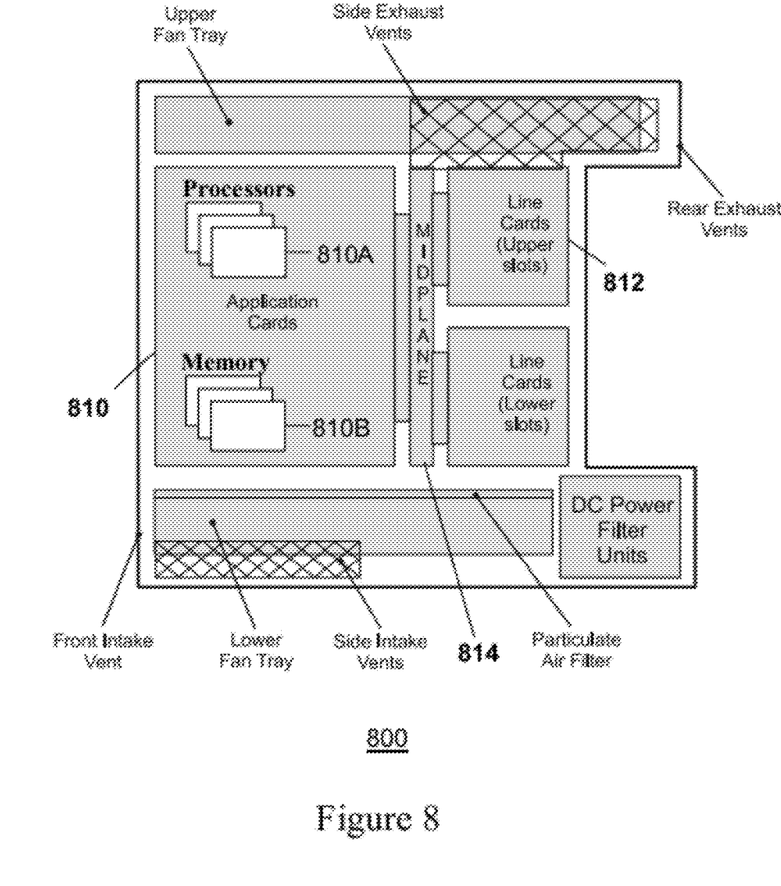
FIG. 8 illustrates components of a gateway in accordance with certain embodiments.

FIG. 8 illustrates a gateway 800 in accordance with certain embodiments. The gateway can include slots for loading application cards 810 including processor(s) 810A and memory 810B and line cards 812. A midplane 814 can be used in the gateway to provide intra-gateway communications, power connections, and transport paths between the various installed cards. The midplane 814 can include buses such as a switch fabric, a control bus, a system management bus, a redundancy bus, and a time division multiplex (TDM) bus. The switch fabric is an IP-based transport path for user data throughout the gateway implemented by establishing inter-card communications between application cards and line cards. The control bus interconnects the control and management processors within the gateway. The gateway management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The gateway supports at least two types of application cards: a switch processor card and a packet accelerator card. The switch processor card serves as a controller of the gateway and is responsible for such things as initializing the gateway and loading software configurations onto other cards in the gateway. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit (NPU). The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the gateway provide input/output connectivity and can also provide redundancy connections as well.

An ST40 embodiment of the gateway can support a system management card (SMC) and a packet services card (PSC), which are application cards 810. The system management card is a system control and management card for managing and controlling other cards in the gateway. The packet services card is a high-speed processing card that provides multi-threaded point-to-point, packet data processing, and context processing capabilities, among other things.

The operating system software can be based on a Linux software kernel and run specific applications in the gateway such as monitoring tasks and providing protocol stacks. The software allows gateway resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a MAG, LMA, HSGW, P-GW, MME, PDSN, ASNGW, PDIF, HA, GGSN, or IPSG).

The gateway's software can be divided into a series of tasks that perform specific functions. These tasks communicate with each other as needed to share control and data information throughout the gateway. A task is a software process that performs a specific function related to system control or session processing. Three types of tasks operate within the gateway in some embodiments: critical tasks, controller tasks, and manager tasks. The critical tasks control functions that relate to the gateway's ability to process calls such as gateway initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a gateway include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the gateway by monitoring the various software and hardware components of the gateway. Recovery control task subsystem is responsible for executing a recovery action for failures that occur in the gateway and receives recovery actions from the high availability task subsystem. Shared configuration task subsystem provides the gateway with an ability to set, retrieve, and receive notification of gateway configuration parameter changes and is responsible for storing configuration data for the applications running within the gateway. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the gateway, which include creating separate VPN contexts, starting IP services within a VPN context, managing IP pools and subscriber IP addresses, and distributing the IP flow information within a VPN context. In some embodiments, within the gateway, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

In some embodiments, the software needed for implementing a process or a database includes a high level procedural or an object-orientated language such as C, C++, C#, Java, or Perl. The software may also be implemented in assembly language if desired. Packet processing implemented in a gateway can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present disclosure has been described and illustrated in the foregoing exemplary embodiments, it is understood that the present disclosure has been made only by way of example, and that numerous changes in the details of implementation of the disclosure may be made without departing from the spirit and scope of the disclosure, which is limited only by the claims which follow.

What is claimed is:

1. A video processing server, comprising:
a memory capable of storing data; and
a processor configured for using the data;
wherein the processor is configured to:
receive, from a client, a redirected request for video content, wherein the redirected request is sent from the client to the video processing server in response to the client receiving a redirect request from a gateway, wherein the gateway determines to send the redirect request to the client based on control data contained in an initial request for the video content, the initial request received at the gateway from the client, and wherein the control data is to be used for adjusting a quality of the video content for delivery;
send the redirected request from the client to a content provider identified in the request;
terminate an initial connection with the client;
receive the requested video content from the content provider;
identify at least a subset of the video content for adjusting the quality of the video content based on the control data;
generate a response to the redirected request by modifying at least one visual characteristic of the identified video content based on the control data; and
transmit the generated response to the client.

2. The system of claim 1, wherein the processor is further configured for using the data such that the video processing server can send the response to a mobile device requesting the video content via the gateway.

3. The system of claim 2, wherein the video content includes a real-time video stream and wherein the gateway dynamically detects changes in effective quality of service of a network carrying the real-time video stream and further modifies the response using the detected changes.

4. The system of claim 1, wherein generating the response to the request includes at least one of trans-rating the identified video content, trans-coding the identified video content, and compressing the identified video content.

5. The system of claim 1, wherein generating the response to the video content request is also based on at least one of subscription profile, roaming status of a mobile device requesting the video content, network congestion status, a time of a day, and a day of a week.

6. The system of claim 1, wherein the control data includes at least one of:
- a display capacity of a requesting device;
- a capacity of a network for carrying video traffic; and
- a requested quality of service.

7. The system of claim 1, wherein the processor is further configured to use the data such that the video processing server can handle an incorrectly redirected video content request.

8. The system of claim 1, wherein the processor is further configured to use the data such that the video processing server can add to the response at least one of:
- one or more static images; and
- one or more overlays of video image data.

9. The system of claim 1, wherein a proxy in the gateway is used to receive the video content request and direct it to the video processing server.

10. The system of claim 1, wherein, for video content requests that are not redirected to the video processing server, the gateway sends the video content request to the content provider and generates a response using the requested video content received from the content provider.

11. The system of claim 1, wherein the gateway enhances the control data using a profile of a subscriber requesting the video content before the request is redirected to the video processing server.

12. A method comprising:
- receiving, from a mobile device, a redirected request for video content, wherein the redirected request is sent from the mobile device to a video processing server in response to the mobile device receiving a redirect request from a gateway, wherein the gateway determines to send the redirect request to the mobile device based on control data contained in an initial request for the video content, the initial request received at the gateway from the mobile device, and wherein the control data is used for adjusting a quality of the video content for delivery;
- sending the redirected request received from the mobile device to a content provider identified in the redirected request;
- terminate an initial connection with the mobile device;
- receiving the requested video content from the content provider;
- identifying at least a subset of the video content for adjusting the quality of the video content based on the control data; and
- generating a response to the redirected request by modifying at least one visual characteristic of the video content based on the data; and
- sending the response to the mobile device requesting the video content via the gateway.

13. The method of claim 12, wherein generating the response to the request by modifying the video content comprises at least one of trans-rating the video content, trans-coding the video content, and compressing the video content.

14. The method of claim 12, wherein generating the response to the video content request is also based on at least one of subscription profile, roaming status of a mobile device requesting the video content, network congestion status, a time of a day, and a day of a week.

15. The method of claim 12, wherein the data comprises at least one of:
- a display capacity of a requesting device;
- a capacity of a network for carrying video traffic; and
- a requested quality of service.

16. The method of claim 12, further comprising:
- handling an incorrectly redirected video content request by generating a response without performing any dynamic video processing functions.

17. The method of claim 12, further comprising adding to the response at least one of:
- one or more static images; and
- one or more overlays of video image data.

18. The method of claim 12, wherein a proxy in the gateway receives the video content request and directs it to the video processing server.

19. The method of claim 12, wherein the gateway enhances the information in the video content request using a profile of a subscriber requesting the video content.

20. A computer program product residing on a non-transitory computer-readable medium, the computer program product comprising computer executable code which, when executed by one or more processors, causes the one or more processors to perform a method comprising:
- receiving, from a mobile device, a redirected request for video content, wherein the redirected request is sent from the mobile device to a video processing server in response to the mobile device receiving a redirect request from a gateway, wherein the gateway determines to send the redirect request to the mobile device based on control data contained in an initial request for the video content, the initial request received at the gateway from the mobile device, and wherein the control data is used for adjusting a quality of the video content for delivery;
- sending the redirected request received from the mobile device to a content provider identified in the redirected request;
- terminate an initial connection with the mobile device;
- receiving the requested video content from the content provider;
- identifying at least a subset of the video content for adjusting the quality of the video content based on the control data;
- generating a response to the redirected request by modifying at least one visual characteristic of the identified video content based on the data; and
- sending the response to the mobile device requesting the video content via the gateway.

* * * * *